(12) United States Patent
McNicholas

(10) Patent No.: US 8,662,235 B2
(45) Date of Patent: Mar. 4, 2014

(54) COMPRESSED NATURAL GAS VEHICLE SAFETY SYSTEM AND METHOD

(76) Inventor: Daniel McNicholas, Oak Lawn, IL (US)

(*) Notice: Subject to any disclaimer, the term of this patent is extended or adjusted under 35 U.S.C. 154(b) by 0 days.

(21) Appl. No.: 13/463,022

(22) Filed: May 3, 2012

(65) Prior Publication Data

US 2013/0112295 A1    May 9, 2013

(51) Int. Cl.
    *B65B 3/00*    (2006.01)
    *B60L 3/04*    (2006.01)
(52) U.S. Cl.
    USPC ............... 180/271; 307/10.1; 141/4; 141/94; 141/98; 141/197
(58) Field of Classification Search
    USPC ............... 141/4, 94–95, 98, 197, 231, 382; 180/271; 307/10.1
    See application file for complete search history.

(56) References Cited

U.S. PATENT DOCUMENTS

| 4,227,497 | A | | 10/1980 | Mathieson |
| 4,527,600 | A | * | 7/1985 | Fisher et al. ................. 141/4 |
| 5,249,612 | A | * | 10/1993 | Parks et al. ................. 141/219 |
| 5,720,327 | A | | 2/1998 | Foster, Jr. |
| 6,382,269 | B1 | * | 5/2002 | Tatsuno ...................... 141/94 |
| 6,712,171 | B2 | * | 3/2004 | Farmer ....................... 180/286 |
| 7,195,093 | B1 | * | 3/2007 | Ahmadi ...................... 180/286 |
| 7,350,604 | B2 | * | 4/2008 | Veenstra et al. ............. 180/69.4 |
| 7,412,994 | B2 | * | 8/2008 | Corless et al. .............. 141/198 |
| 7,671,482 | B2 | * | 3/2010 | Tighe .......................... 307/9.1 |
| 7,896,036 | B2 | * | 3/2011 | Kobayashi et al. .......... 141/94 |
| 7,970,528 | B2 | * | 6/2011 | Janarthanam et al. ...... 701/114 |
| 2002/0162601 | A1 | | 11/2002 | Jin et al. |
| 2008/0185912 | A1 | | 8/2008 | Tighe |
| 2008/0290152 | A1 | | 11/2008 | Lundgren et al. |
| 2012/0305127 | A1 | * | 12/2012 | Roys et al. ................... 141/1 |

FOREIGN PATENT DOCUMENTS

US    PCT/US13/039006    5/2013

* cited by examiner

*Primary Examiner* — Timothy L Maust
*Assistant Examiner* — Timothy P Kelly
(74) *Attorney, Agent, or Firm* — Clifford Kraft

(57) ABSTRACT

A multiply-redundant system that prevents a driver from starting and/or moving a vehicle if a compressed natural gas fill system is not correctly and completely disconnected from the vehicle. One or more sensors in combination with one or more optional microswitches combine to lock-out the vehicle's ignition or otherwise prevent it from starting and/or moving. For different levels of safety, different combinations of sensors can be used with the lowest level having a single proximity sensor sensing the presence or absence of a high-pressure fill hose. The highest level of safety being achieved by having separate proximity sensors on the fuel fill hose fitting, the gas cap cover and a manual safety valve along with a redundant microswitch. An optional override that may be restricted as to the number of times it can be used can allow starting with a faulty sensor in order to allow maintenance.

16 Claims, 6 Drawing Sheets

COMPRESSED NATURAL GAS VEHICLE SAFETY SYSTEM AND METHOD

BACKGROUND

1. Field of the Invention

The present invention relates generally to the fields of vehicle safety and compressed natural gas and more particularly to safety system related to fueling vehicles powered by compressed natural gas.

2. Description of the Prior Art

Natural gas is becoming an abundant resource in the United States and several other countries. It is estimated that the natural gas reserves of the U.S. exceed the oil reserves of Saudi Arabia in terms of years of energy supply.

In order to utilize this resource effectively, and to replace crude oil, natural gas must be used in vehicles. Many fleet operators are switching their vehicles to natural gas since, with minor modifications, internal combustion engines run very well on natural gas.

Natural gas is typically supplied in two different forms: 1) as a compressed gas, and 2) as a liquefied gas. While more efficient in terms of the amount of gas that can be supplied in a single tank, liquefied gas is very dangerous to handle and requires highly specialized equipment to fuel with it and actually use it. On the other hand, compressed natural gas is relatively easy to fuel with and to utilize. Compressed natural gas can be supplied in pressure bottles a pressures between 3000 psi and 4000 psi. It is very well known in industry how to handle and fill such bottles. A natural gas "gas station" can fill a vehicle tank (pressure bottle) in just a few moments using fill techniques similar to high pressure air. A vehicle tank containing 100-200 cu. feet of natural gas at a pressure of 3500 psi is typically not more dangerous than a typical automobile's gasoline tank. The tank can be shielded from direct impact in an accident.

Many households and businesses in the U.S. have piped in natural gas for cooking and, in many cases, heating. Most Americans own at least one car or other vehicle, with many households owning several vehicles. This combination immediately suggests the possibility of filling a natural gas vehicle at home during the night for use the next day, or filling at the location of a small business. Because even a large compressed natural gas tank will not last as long between refills as a typical gasoline tank, it will become a very convenient to refill it during the night. The vehicle owner can also use natural gas filling stations; however, these will probably be more convenient for extended trips. Most people would prefer not to have to wait 5-10 minutes at a gas station to fill their vehicle. While exchangeable tanks are also possible, these require considerably more logistics and handling than a simple fixed onboard tank. Even with exchangeable tanks, the vehicle owner would still probably have to wait considerably longer to get a refill at a station than they currently do with gasoline.

At the present time, at least one car manufacturer is supplying a compressed natural gas vehicle and a home compressor to fill it. National fire codes currently prevent large gas storage tanks in homes or compressors that fill at fast rates. Given present standards, the home compressor will be directly attached to the vehicle via a high pressure hose, and the vehicle will take several hours to fill (depending on the size of the onboard tank). Again, this will be very conveniently accomplished during the night. The same arrangement can be used at small businesses, especially those with fleets of vehicles.

However, with numerous individuals filling natural gas vehicles in their garages at night or at their business locations, the potential for a very serious type of accident increases dramatically—namely what is called a drive-off accident. This is where the driver tries to drive away with the high pressure filling hose still attached to the vehicle. Such an accident in a home garage could be catastrophic if the fitting or valve on the vehicle is damaged, or if the compressor is pulled away from the home natural gas source. In either case, a considerably amount of gas could escape into the garage causing a fire or explosion danger. Also, even a "soft" drive-away accident, one where the driver stopped before breaking the hose or fitting could stress the fill hose and possibly cause small, very hard to detect, gas leaks. Such small leaks could result in the garage being filled with gas by morning.

Natural gas contains mostly methane and is thus lighter than air. Natural gas leaking in a garage will fill the garage from top to bottom. An explosive mixture for natural gas and air is between around 5% (for pure methane) and around 15-20%. Many garages contain furnaces and water heaters having open flames. As natural gas fills a garage, it can be easily ignited by a furnace or a water heater on a raised pedestal (fire codes require open flame devices in garages to mounted on pedestals to avoid gasoline vapor that might collect along the floor from a car gasoline leak). This is an ideal situation for a garage explosion. Hence anything that has the possibility of causing the release of natural gas or of causing a gas leak becomes a large danger. A drive-away accident is such an event.

Some techniques have been reported in the art to prevent a gasoline vehicle from starting at a gasoline station if the fill nozzle is still in the gas tank inlet. Among these are U.S. Published Application No. 2002/0162601 and U.S. Pat. No. 5,720,327. Other techniques have been invented to prevent pumping gasoline or other fuel if the fill hose is not in the fill inlet. Among these are U.S. Published Application No. 2008/0290152 and U.S. Pat. No. 4,227,497.

While these prior art techniques are useful for gasoline, they do not solve the problems associated with home or business filling a vehicle with high pressure compressed natural gas. In particular, a compressed natural gas tank is filled to a very high pressure (between 3000 and 4000 psi). A leak or disconnect of a fitting or valve on such a pressure vessel can cause a tremendous pressure explosion that can act like a bomb (this can happen with any compressed gas including air). Also, a very small leak at high pressure can cause a large quality of gas to escape. For example, an exploding tank can send metal fragments in all directions with enough force to penetrate the house and the driver's compartment of the vehicle. This can happen before there is any fire. After that, the tiniest spark could ignite the now explosive and highly flammable gas cloud reducing the house or business to rubble. Even a quick-disconnect hose does not typically solve the problem since the driver may attempt to drive away very quickly still damaging the fittings, tank, hose, compressor and/or natural gas supply.

It would be very advantageous to have doubly or triply redundant system and method that prevents the driver from ever starting the vehicle when the filling hose is attached and a safety valve is not in the correct position.

SUMMARY OF THE INVENTION

The present invention relates to a multiply-redundant system and method for preventing a driver from starting or moving a compressed natural gas vehicle if the high pressure gas fill system is not correctly and completely disconnected from the vehicle.

In one embodiment of the invention, multiple electrical proximity sensors, or other sensors, in combination with one or more optional mechanical microswitches combine to lockout the vehicle's ignition or otherwise disable the vehicle. For different levels of safety, different combinations of sensors can be used, with the lowest level having a single sensor sensing the presence or absence of a fuel supply fitting. The highest level of safety according to the invention is to have separate sensors, such as proximity sensors, on the fuel fill hose fitting, the gas cap cover and a manual safety or isolation valve along with a redundant microswitch on at least one of the components. The ignition, transmission or other function can be locked out by an electrical or mechanical lockout provided to the vehicle's computer by the manufacturer, or by a simple series electrical circuit in the ignition string. The safest system could use both techniques.

In addition, the vehicle's computer, or another simple electrical circuit, could provide a visual and/or audio indication that one or more of the sensors was indicating an attached fuel hose. The alarm could be activated the instant the driver inserts a key into the ignition. Under the present invention, it is understood that there is a possibility that one of the sensors might fail in a state that indicates the fuel hose is connected when, in reality, the system is entirely safe. In this very special case, the present invention provides a technique for the driver, on a limited-time basis, to override the sensors and start the engine or move the vehicle using a supplied override. Having this feature allows the driver to drive to a mechanic to have the problem fixed. This feature could be automatically disabled by an abuse preventer after a predetermined number of uses (such as three times) to keep a driver with a bad sensor from delaying getting it fixed. Finally, an optional break-away fitting can also be provided in addition to the other features of the invention for a final level of protection.

DESCRIPTION OF THE FIGURES

Attention is now directed to several drawings the illustrate features of the present invention.

Several drawings and illustrations have been presented to aid in understanding the present invention. The scope of the present invention is not limited to what is shown in the figures.

DETAILED DESCRIPTION OF THE INVENTION

Figure 1A:
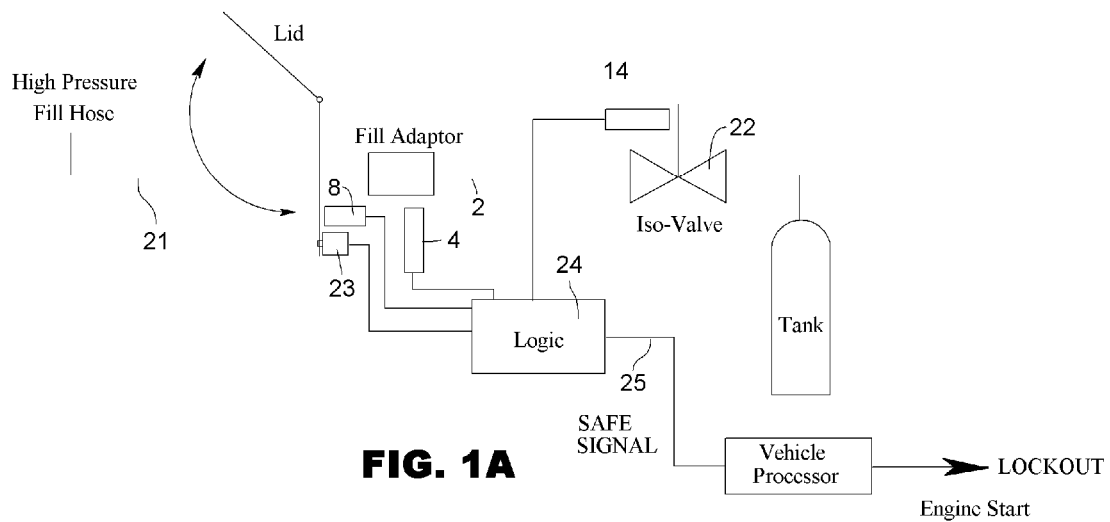
FIG. 1A shows a block diagram of an embodiment of a high-safety lock-out system according to the present invention.

The present invention relates to a system and method that provides a lockout out to a vehicle's ignition, transmission or other means of moving the vehicle when a high pressure compressed natural gas fuel hose is attached to the vehicle an/or the fill cap is open. FIG. 1A shows a block diagram of an embodiment of such a system. A compressed gas fuel fitting 2 accepts a high pressure filling hose 21 that allows filling through an isolation valve 22. The isolation valve 22 can be manually opened, or it can be opened mechanically when a panel lid or "gas cap" is opened. A sensor 4, which can be an electrical proximity sensor, senses the presence of the fitting part of the high pressure filling hose 21. An optional second sensor 8 senses that the panel or gas cap is open. An optional third sensor 14 can sense the position of an isolation valve 22 (on vehicles that have such a valve). All of the sensors can be magnetic, optical or ultra-sonic proximity sensors, or any other sensors, and use any method of sensing proximity or that a particular mechanical part is or is not in a particular position. One or more optional mechanical microswitches 23 can provide a backup to one or more of the sensors.

Figure 1B:
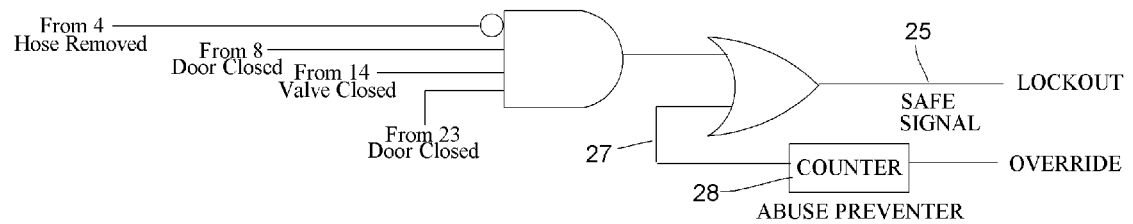
FIG. 1B shows a logic circuit that can combine sensors inputs.

A further logic circuit 24 or other lockout which can be a separate unit, or part of the vehicle's processor, can combine the inputs from all the sensors 4, 8, 14, and the optional microswitch 23 to produce a safe signal 25 that will allow the vehicle ignition to start the car, or otherwise allow the vehicle to move. FIG. 1B shows a schematic representation of this circuit 24. Here, each sensor's signal is amplified and conditioned and fed into an AND logic circuit 26. If any of the sensors is in an unsafe condition, the AND circuit 26 will not produce a "safe" signal. The particular circuit of FIG. 1B assumes that a proximity sensor has a logic high when there is proximity, and that the microswitch is high when the lid is closed. Any other logic levels or configurations can be used. In particular, a program in a microcontroller or other processor could also make the determination. As is well understood in the art, an OR circuit could also be effectively used instead of an AND circuit. Any circuit or program that combines sensor inputs to make a "safe" determination is within the scope of the present invention.

FIG. 1B also shows an override 27 that can be used to force a "safe" condition when one of the sensors is in an unsafe state. This circuit is optional but, when provided, allows the driver to drive to a mechanic with a failing sensor. A counter 28 or other abuse preventer prevents the override from being used more than a predetermined number times before repairing the sensor (for example three times). The counter 28 can be optionally reset whenever the sensor logic produces a safe signal. In the present example, the driver can enter a special PIN code 29 to activate the override and override the sensors. While providing this circuit lowers the overall safety threshold of the system slightly, the act of performing the override can be made difficult enough that a driver will not routinely use it to avoid having to fix a faulty sensor. Optionally, the override could be restricted to use only by a certified mechanic. In this case, the driver would not be allowed to operate it. While a simple override switch can be used, for additional safety, a PIN or barcode or any other unique identification 29 might be required. If a PIN is used, a PIN entry method can be used such as a keypad or a card swipe. If a barcode is used, a small barcode reader can be supplied.

Figure 2:
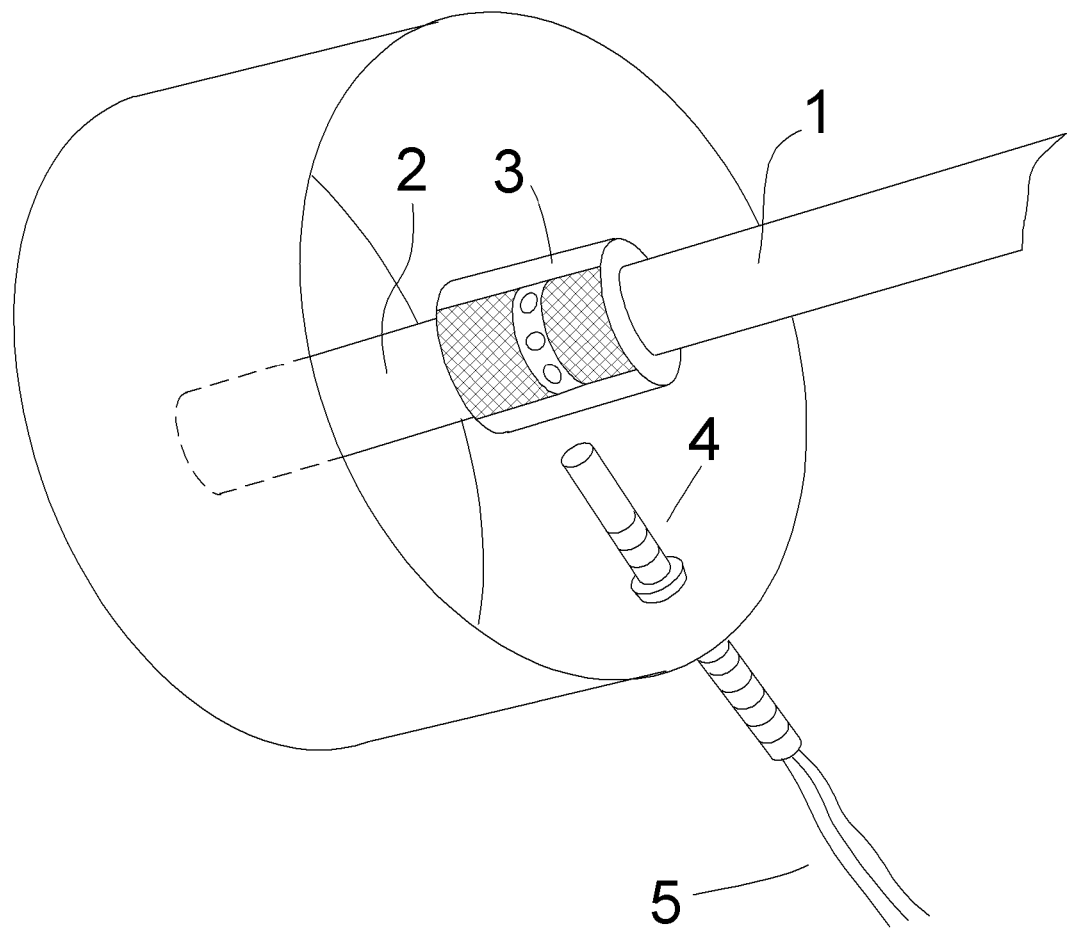
FIG. 2 shows a detail drawing of a fill fixture with a proximity sensor.

FIG. 2 shows a male tank adapter 2 on the vehicle with a coupled (usually spring coupled) female filling locking coupler 3 and high pressure feed hose 1. The feed hose 1 typically originates at a compressor or storage tank. A proximity sensor 4 with electrical connections 5 senses the presence of the feed hose (unsafe condition). The female locking coupler 3 typically has a connect/disconnect fitting that clamps the tank adapter 2 and makes a high pressure, leak-proof connection. It should be noted that the female filling locking coupler 3 could be a quick-release, break-away fitting. This would add a final mechanical precaution to the system where the hose would manually break free in the case that somehow the rest of the system failed.

Figure 3:
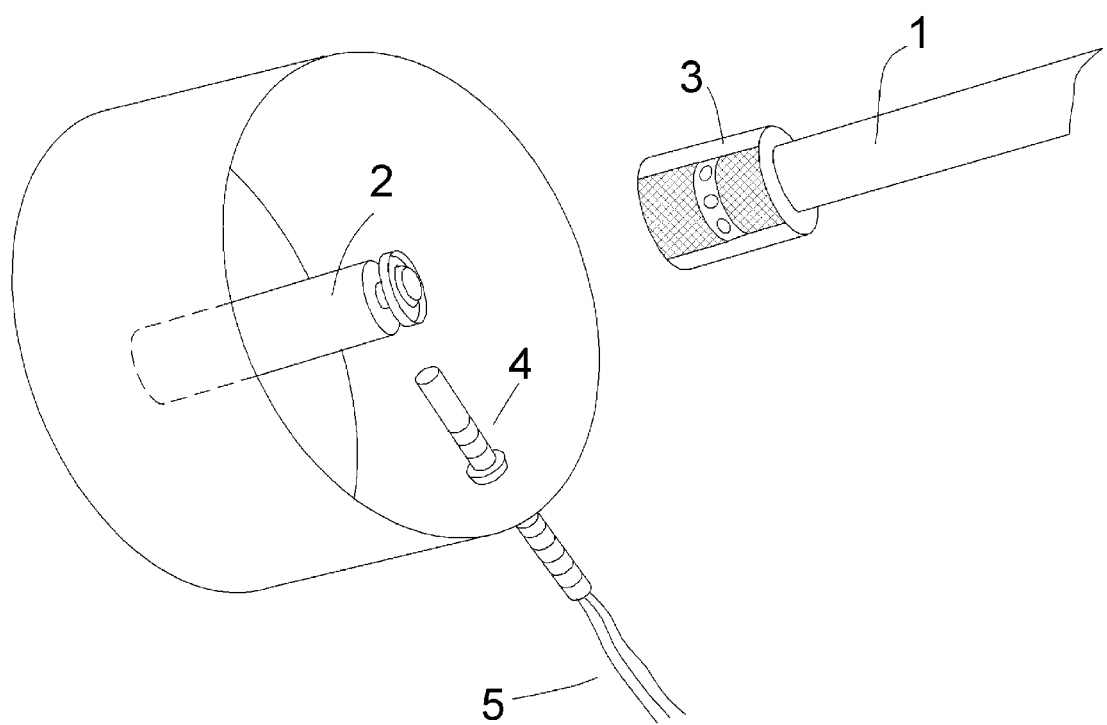
FIG. 3 shows the system of FIG. 2 with the high pressure fill hose removed.

FIG. 3 shows the same setup but with the feed hose 1 and the female locking coupler 3 uncoupled and withdrawn (safe position) from the male filling adapter 2.

Figure 4:
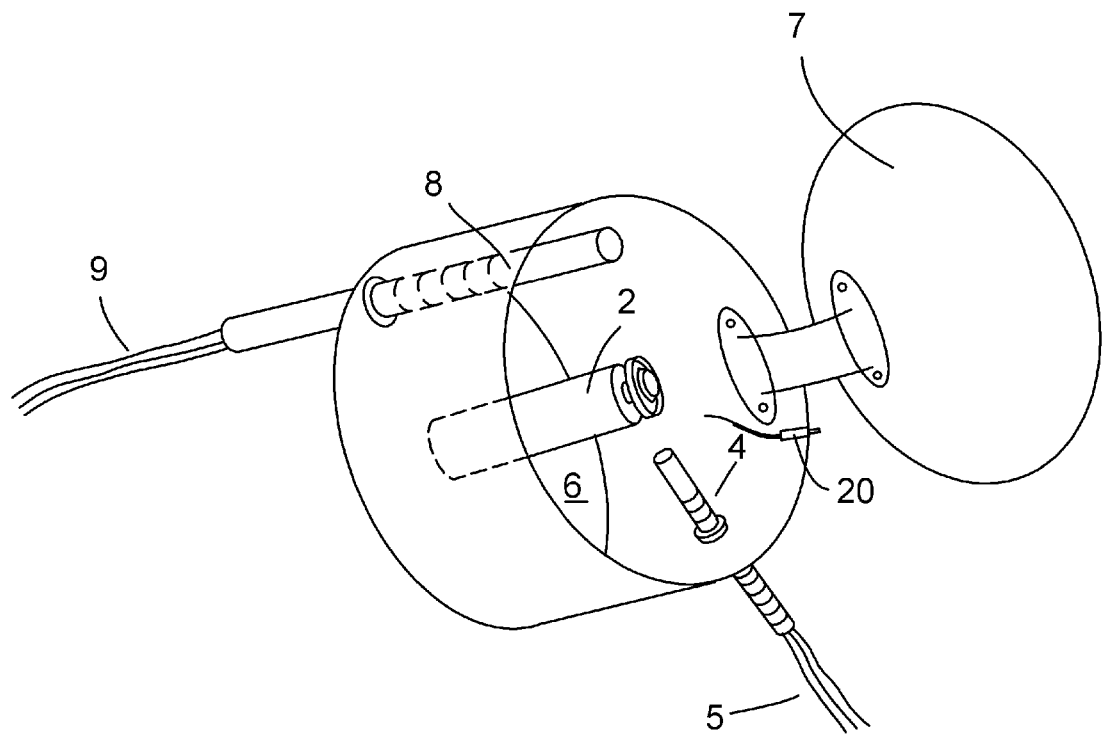
FIG. 4 shows a system similar to that of FIGS. 2-3 with an additional gas cap sensor.

FIG. 4 shows a fill cavity 6 and fill access lid 7 that swings open on hinges. A second proximity sensor 8 has a second electrical feed 9. This sensor 8 can be used in embodiments of the invention either alone or in conjunction with the feed hose sensor 4. An optional additional microswitch 20 is also shown.

Any type of sensor can be used with the present invention. A preferred sensor is a magnetic or optical proximity sensor; however, other sensor types can be used such as ultra-sonic sensors and others.

Figure 5:
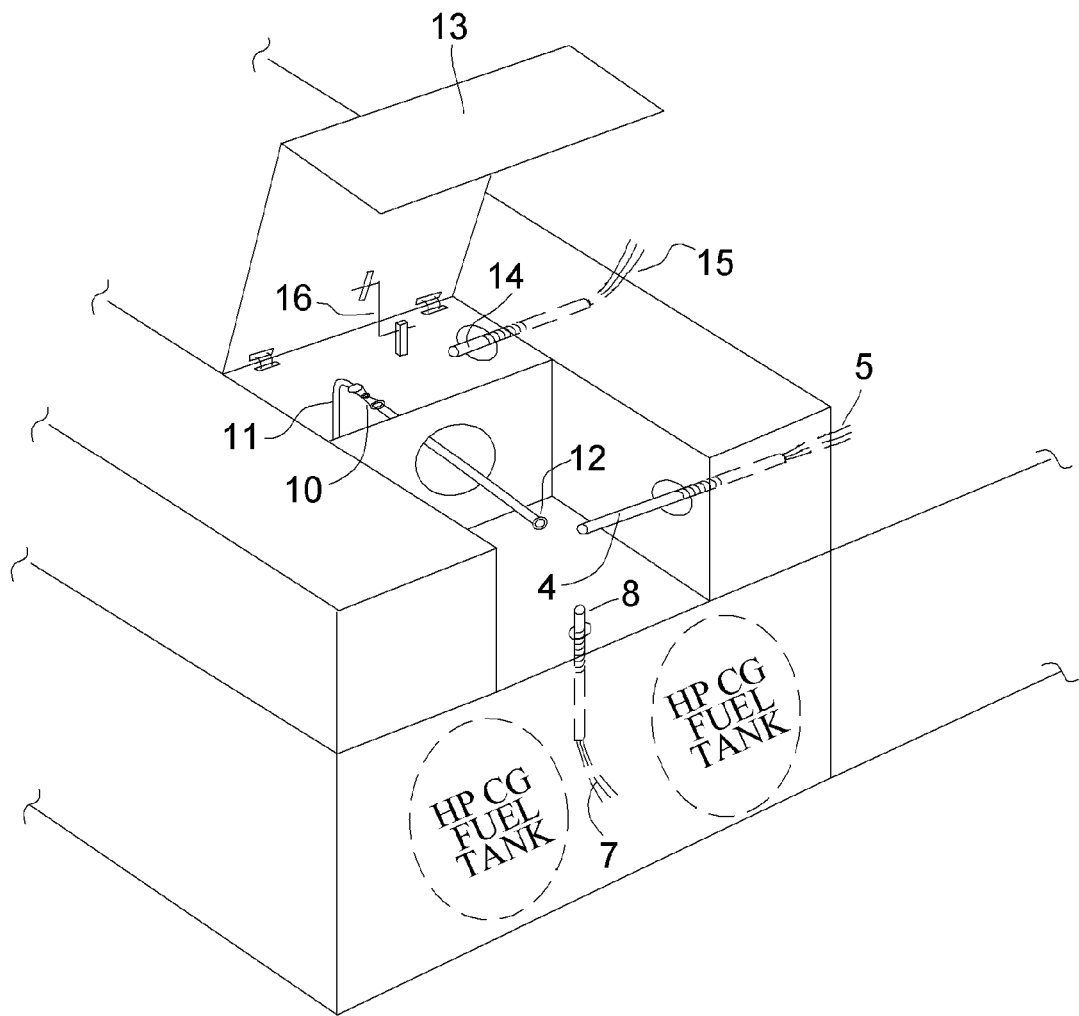
FIG. 5 shows a panel-type filling system with an isolation valve and three proximity sensors.

FIG. 5 shows a different arrangement of the fueling system. This type of system is more commonly found on trucks and larger vehicles. A panel 13 opens and closes to allow access to a tank adapter 12. An isolation valve 10 can be manually operated or can operate in conjunction with a lever 16 on the panel 13. A third proximity sensor 14 with electrical feed 15 can be used to sense whether the panel is open or closed (and hence, if the lever 16 is used with the valve 10, whether the valve is open or closed). The valve 10 isolates the tank adapter 12 from the tank when the panel is closed.

Figure 6:
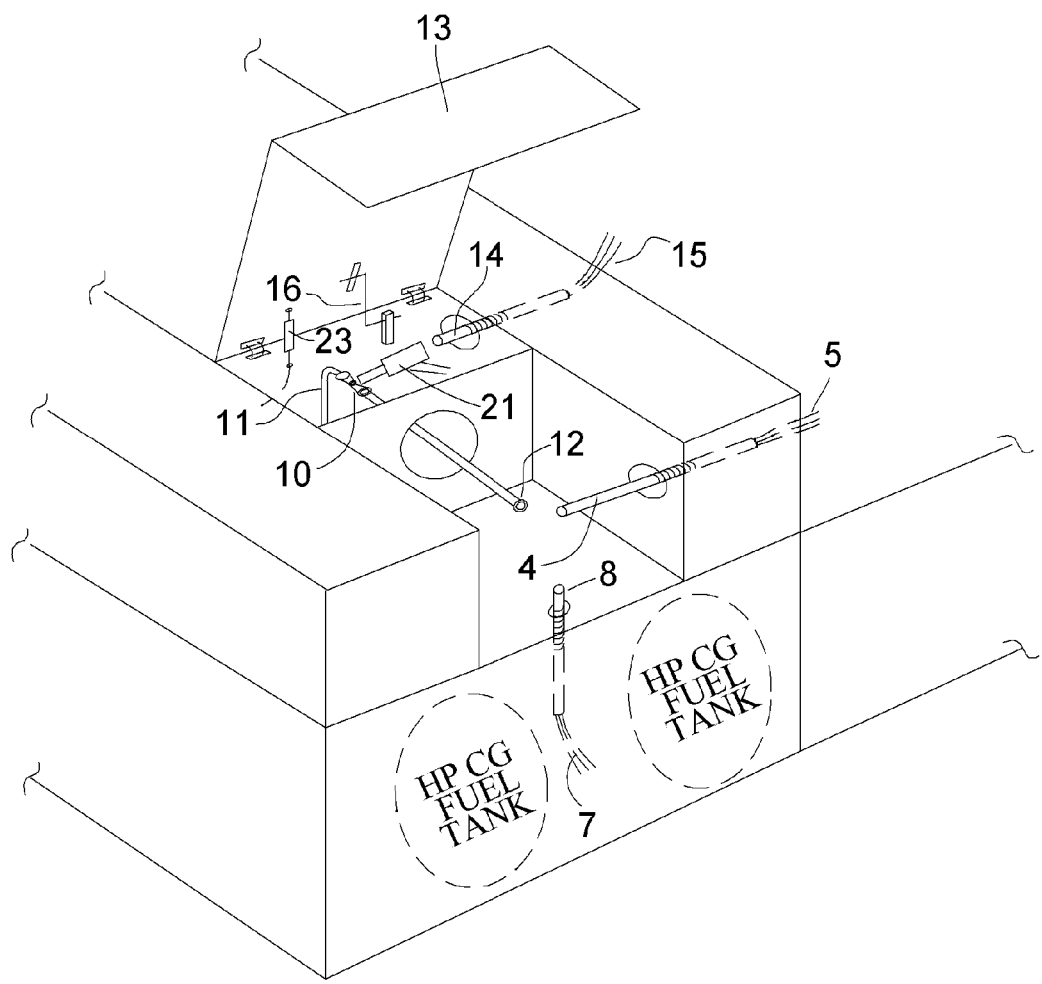
FIG. 6 shows the system of FIG. 5 with an additional mechanical microswitch.

FIG. 6 shows the same embodiment as FIG. 5 except that an optional microswitch 23 has been added to the panel 13. This is a simple mechanical backup that does not rely on proximity sensors. It should be noted that any of the proximity sensors shown in the various embodiments of the present invention may be replaced by microswitches or other mechanical devices, or each proximity sensor may be optionally backed up with an additional microswitch. In addition, FIG. 6 shows an optional additional microswitch 21 on the isolation valve 10.

It should be noted that an optional natural gas leak sensor can also be included with the system of the present invention to provide an addition source of safety. Such a sensor could keep the vehicle in a disabled state if an unreasonable concentration of free natural gas is sensed. Such a sensor could also sound an alarm on the vehicle or on the compressor. It is also possible that any of the above-mentioned sensors or circuits can communicate with the lockout or other logic wirelessly such as by radio or light. Finally, it should be noted that a processor with memory and a stored program can perform the logic function of the lockout, override and/or abuse preventer. This can also be any digital or analog logic circuit or simply relays. In addition, an internet or network interface can be provided to remotely report or log the status of the system. This feature can be useful for fleet operators to track safety, for example, the number of attempts to drive off under a lockout condition or the number of overrides.

The present invention provides a multiply-redundant system to enhance the safety of home or business fueling of compressed natural gas vehicles. It can also be used on vehicles using propane or any other compressed gas fuel. A system of one or more sensors determines if the fueling system is in a safe state. This can be a state with the high pressure fill hose removed, the fueling compartment access lid closed, and any isolation valve in the correct position. A lockout prevents either the vehicle from starting or otherwise makes it impossible to move the vehicle when the system is not in a safe state. In order that a driver can get a faulty sensor repaired, an override can be provided that allows the safety sensors to be overridden and the vehicle moved. This override can be equipped with an abuse preventer that only allows the override to be used for a predetermined number of times before the override itself is disabled. This prevents a driver from putting off getting a faulty sensor repaired. An audio and/or visual indicator can sound or display when the driver inserts the key into the ignition in an unsafe state, or alternatively, when the driver turns the key to start.

In the present invention, a lockout is any method, means or technique to prevent a vehicle from moving including a circuit or module that can disable the ignition or transmission or disable the vehicle in any other way. An override is a any method, means or technique to allow the vehicle to move in spite of the lockout—any way of overriding the lockout. An abuse preventer is any method, means or technique to prevent abuse of the override by limiting the number of times (especially successive times) it can be used.

Several descriptions and illustrations have been presented to aid in understanding the features of the present invention. One with skill in the art will realize that numerous changes and variations may be made without departing from the spirit of the invention. Each of these changes and variations is within the scope of the present invention.

I claim:

1. A vehicle safety system for disabling a compressed natural gas-fueled vehicle while fueling, comprising:
    a first sensor adapted to sense presence of a high pressure natural gas fill hose in proximity to a tank fill adapter coupled to a high pressure natural gas tank;
    a second sensor adapted to sense an open/closed position of a fill access cap, said fill access cap closing a compartment containing said tank fill adapter;
    a third sensor adapted to sense an open/closed position of an isolation valve, said isolation valve isolating said tank fill adapter from said high pressure natural gas tank when closed;
    a logic circuit adapted to combine inputs from said first, second and third sensors to produce a safe electrical signal indicating a safe condition when said fill hose is not in proximity to said tank fill adapter, said fill access cap is closed, and said isolation valve is closed;
    a lockout circuit adapted to disable said vehicle when said safe electrical signal is absent.

2. The vehicle safety system of claim 1 further comprising a microswitch adapted to sense the position of said fill cap or isolation valve in addition to said second sensor, wherein said logic fails to produce the safe electrical signal when said microswitch senses said fill cap is open or said isolation valve is in an unsafe position.

3. The vehicle safety system of claim 1 further comprising an override that overrides said logic circuit and produces said safe electrical signal when activated.

4. The vehicle safety system of claim 3 wherein said override is adapted to be used only a predetermined number of successive times.

5. The vehicle safety system of claim 4 further comprising a counter circuit adapted to count successive uses of said override, and wherein said counter circuit is reset when said logic circuit produces said safe electrical signal.

6. The vehicle safety system of claim 1 wherein said sensors are magnetic, optical or ultra-sonic.

7. The vehicle safety system of claim 1 further comprising a microswitch adapted to sense presence or absence of said a high pressure natural gas fill hose in proximity to said tank fill adapter in addition to said first sensor.

8. A vehicle safety system for disabling a compressed natural gas-fueled vehicle while fueling, comprising:
    a first sensor adapted to sense presence of a high pressure natural gas fill hose in proximity to a tank fill adapter;

a second sensor adapted to sense an open/closed position of a fill access cap, said fill access cap closing a compartment containing said tank fill adapter;

a logic circuit adapted to combine inputs from said first and second sensors to produce an electrical safe signal indicating a safe condition when said gas fill hose is not in proximity to said tank fill adapter, and said fill access cap is closed;

a lockout circuit that disables said vehicle when said electrical safe signal is absent;

an manual override circuit that overrides said logic circuit and produces said safe electrical signal when activated.

9. The vehicle safety system of claim 8 further comprising a third sensor adapted to sense an open/closed position of an isolation valve, said isolation valve isolating said tank fill adapter from said tank when closed, wherein said logic circuit also fails to produce said safe signal when said third sensor indicates the isolation valve is open.

10. The vehicle safety system of claim 8 further comprising a microswitch also adapted to sense the position of said fill access cap in addition to said second sensor, wherein said logic circuit fails to produce said safe electrical signal when said microswitch senses that said fill access cap is open.

11. The vehicle safety system of claim 8 wherein said manual override circuit is adapted to be used only a predetermined number of successive times.

12. The vehicle safety system of claim 8 wherein said manual override circuit maintains a count of successive uses, and said count is reset when said logic circuit produces said safe electrical signal.

13. A method of preventing drive-away accidents while fueling compressed natural gas vehicles comprising:

placing a first proximity sensor on a vehicle adapted to sense presence of a high pressure natural gas fill hose in proximity to a tank fill adapter attached to a high pressure natural gas tank on said vehicle;

placing a second proximity sensor on said vehicle adapted to sense an open/closed position of a fill cap, said fill cap closing a compartment on said vehicle containing said tank fill adapter;

placing a third proximity sensor on said vehicle adapted to sense an open/closed position of an isolation valve, said isolation valve isolating said tank fill adapter from said tank when closed;

providing a logic circuit adapted to combine inputs from said first, second and third proximity sensors to produce a safe signal indicating a safe condition when said gas fill hose is not in proximity to said tank fill adapter, said fill cap is closed, and said isolation valve is closed;

providing a circuit that disables starting of said vehicle when said safe signal is absent.

14. The method of claim 13 further comprising providing an override circuit that overrides said logic circuit and produces said safe signal when activated.

15. The method of claim 14 wherein said override circuit is adapted to be used only a predetermined number of successive times to override said logic circuit by maintaining a count of times used.

16. The method of claim 15 wherein said count is reset when said logic circuit produces said safe signal.

* * * * *